US 6,633,481 B2

(12) United States Patent
Pavol

(10) Patent No.: US 6,633,481 B2
(45) Date of Patent: Oct. 14, 2003

(54) MEDIA DRIVE VIBRATION ATTENUATION SYSTEM AND METHOD

(75) Inventor: Eric G. Pavol, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 66 days.

(21) Appl. No.: 09/903,924

(22) Filed: Jul. 12, 2001

(65) Prior Publication Data

US 2002/0044415 A1 Apr. 18, 2002

(51) Int. Cl.[7] .................................................. G06F 1/16
(52) U.S. Cl. ..................... 361/685; 361/724; 361/796; 428/166
(58) Field of Search .................. 361/684–685, 361/725–727; 248/634–638; 428/166, 457

(56) References Cited

U.S. PATENT DOCUMENTS

| 4,012,089 | A | | 3/1977 | Ward |
| 5,143,790 | A | * | 9/1992 | Sattinger .................... 428/457 |
| 5,858,509 | A | * | 1/1999 | Polch et al. ................ 428/166 |
| 5,995,377 | A | * | 11/1999 | Tusler et al. ................ 361/796 |
| 6,084,768 | A | | 7/2000 | Bolognia |
| 6,134,113 | A | * | 10/2000 | Mills et al. .................. 361/725 |
| 6,154,361 | A | * | 11/2000 | Anderson et al. ........... 361/685 |
| 6,209,842 | B1 | | 4/2001 | Anderson et al. |
| 6,339,532 | B1 | * | 1/2002 | Boulay et al. .............. 361/685 |

FOREIGN PATENT DOCUMENTS

| EP | 0 564 119 A2 | 10/1993 |
| EP | 0 738 102 A2 | 10/1996 |
| EP | 0 843 314 A1 | 5/1998 |

OTHER PUBLICATIONS

U.S. patent application Ser. No. 09/661,240, Pavol, filed Sep. 13, 2000.
"Hard Drive Dampers" by Heathcote Industrial Plastics Ltd,; www.heathcoats.com, , 1 page.
"Noise Dampers" by Heathcote Industrial Plastics Ltd,; www.heathcote.com, , 1 page.

* cited by examiner

Primary Examiner—Darren Schuberg
Assistant Examiner—Anthony Q. Edwards
(74) Attorney, Agent, or Firm—Brooks Kushman P.C.

(57) ABSTRACT

A system according to the invention for mounting multiple media drives includes a housing and multiple modules that are insertable into and removable from the housing. Each module is adapted to hold a media drive. Furthermore, the system includes a resilient layer disposed between the housing and the modules when the modules are inserted into the housing for attenuating shocks and vibrations. The resilient layer includes a slot for inhibiting transmission of shocks and vibrations between at least two of the modules.

40 Claims, 7 Drawing Sheets

MEDIA DRIVE VIBRATION ATTENUATION SYSTEM AND METHOD

BACKGROUND OF THE INVENTION

1. Field of the Invention

The present invention relates to the field of shock and vibration attenuation for media drives.

2. Background Art

High performance disk drives are finely tuned electromechanical devices. The precision necessary to allow these devices to work is proportional to their capacity to hold customer data and their ability to handle the data in volume. Disk drive performance is dependent on drive design, which includes servo algorithms, spindle and disk pack balancing, internal damping and dynamic characteristics. Disk drive performance is also influenced by the environment in which the disk drive must operate.

In an effort to reduce cost per megabyte of storage, track density, or tracks per inch (TPI), has increased. The TPI trend, along with efforts to reduce packing costs and unit footprints, has led to significant challenges regarding disk drive implementation. Obstacles presented to the industry consist of damping and attenuating the disk drive's own internally generated vibrations, isolating the disk drive from vibrations created by neighboring disk drives, and isolating the disk drive from externally generated shocks and vibrations.

A poorly implemented disk drive mounting solution may cause various problems at a higher system level. An unconstrained, vibrating disk drive will tend to knock itself off track while performing a read or write seek. If the drive cannot successfully find the correct location to read or write on the disk surface, the disk drive must wait until the disk pack rotates around to the same location to attempt the operation again. The extra rotation results in a write or read inhibit that is treated as an error. These errors can affect the input/output speed of the individual disk drive and the system as a whole. If the problem is severe enough, the disk drive will be turned off or fenced due to its inability to read and write data. It is possible that the disk drive will be fenced due a system level mounting problem and not due to a problem with the disk drive itself. Corrective maintenance for shock and vibration induced errors will usually result in the replacement of a healthy disk drive.

Several approaches have been used in attempts to minimize the effects of self-induced vibrations, and externally induced shocks and vibrations on various disk drives. Many of these same approaches are also used with other moving-media type drives such as optical dives, magneto-optical drives, and tape drives, generically referred to as media drives.

A common shock and vibration damping approach is to attach each media drive to a system level drive tray through one or more springs. Springs provide a degree of mechanical isolation between neighboring media drives mounted in the drive tray, as well as isolation from externally induced shocks and vibrations. Springs, however, allow vibrational energy to remain in the media drive thus adding to the energy spectrum of the media drive environment. Springs also contact the media drive chassis in only a few specific locations that are selected based upon a center of mass and not based upon closeness to the vibration sources.

Resonant plates have also been incorporated in damping systems to control the frequency of vibrations present in the media drive's chassis. The plates have a resonant frequency at which the media drive is relatively immune to vibration induced errors. Most of the vibrational energy present in the media drive's chassis is converted to the resonant frequency by the plates. Plates by themselves, however, do not dissipate the vibrational energy. All of the energy that enters the plates eventually returns to the media drive chassis or is transferred away through the springs.

The present invention provides an improved damping mechanism and method of operation that addresses the limitations discussed above.

SUMMARY OF THE INVENTION

A system according to the invention for mounting multiple media drives includes a housing and multiple modules that are insertable into and removable from the housing. Each module is adapted to hold a media drive. Furthermore, the system includes a resilient layer disposed between the housing and the modules when the modules are inserted into the housing for attenuating shocks and vibrations. The resilient layer includes a slot for inhibiting transmission of shocks and vibrations between at least two of the modules.

A tray according to the invention for housing multiple modules includes a housing having multiple bays adapted to receive the modules, and a resilient layer attached to the housing and extending into each of the bays to attenuate shocks and vibrations. The resilient layer includes at least one slot for inhibiting transmission of shocks and vibrations through the resilient layer.

A method for attenuating vibrations between multiple media drives and a tray includes converting the vibrations into resonant vibrations at a resonant frequency in multiple plates associated with the media drives, the resonant frequency being outside an adverse frequency range for the media drives; and damping the resonant vibrations in multiple resilient layers disposed between the tray and the media drives, two of the resilient layers being positioned such that the media drives are disposed between the two resilient layers, each of the two resilient layers having at least one slot for inhibiting transmission of resonant vibrations between at least two of the media drives.

DETAILED DESCRIPTION OF THE PREFERRED EMBODIMENTS

Figure 1:
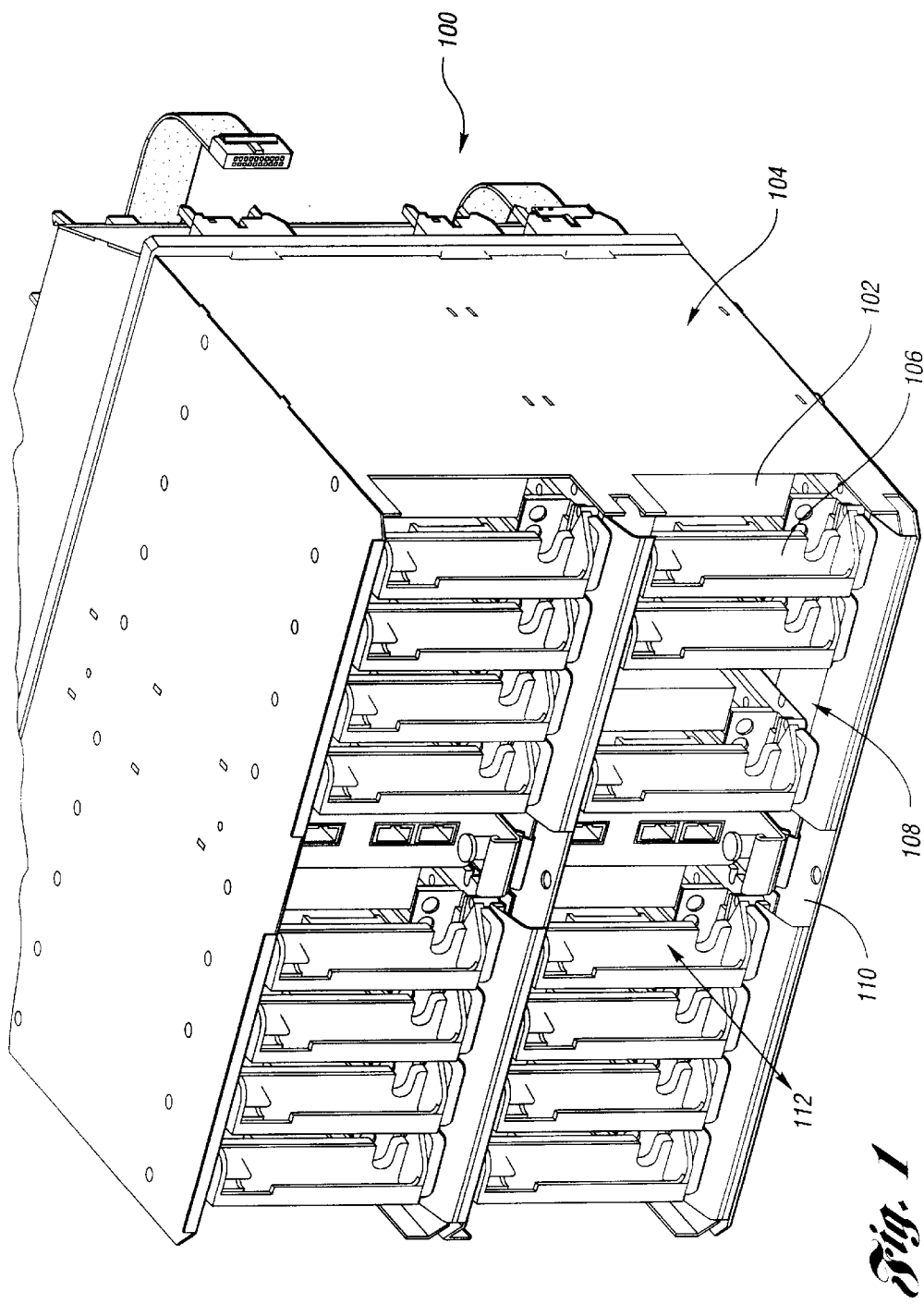
FIG. 1 is a perspective view of an example system according to the present invention including a drive tray and multiple drive modules disposed in bays of the drive tray.
Figure 2:
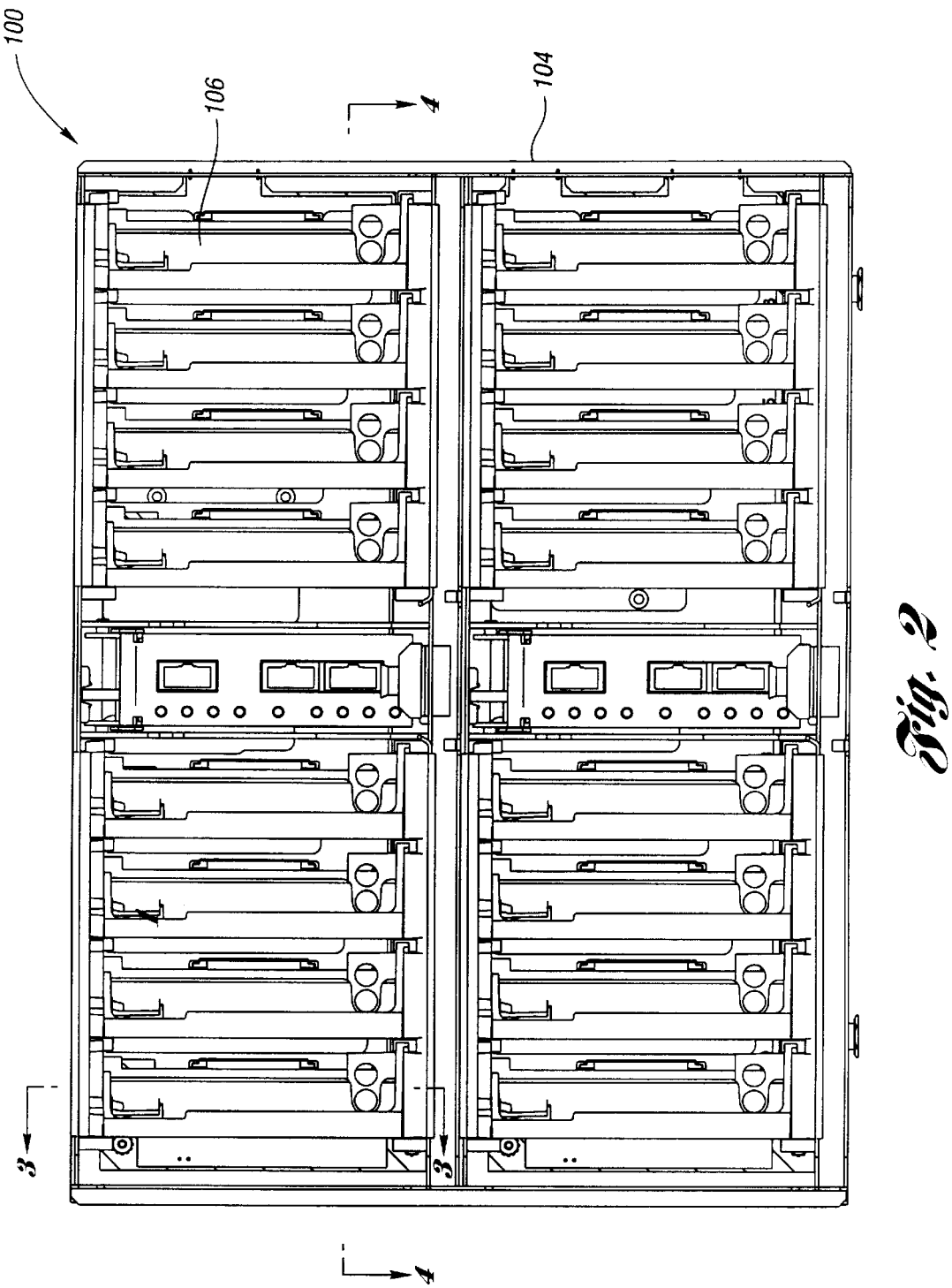
FIG. 2 is a front view of the system.

An example system 100 that implements the present invention for multiple media drives 102 is shown in FIGS. 1 and 2. The system includes a drive tray 104 adapted to hold multiple drive modules 106. Each drive module can be inserted into, and removed from, a bay 108 in a drive tray housing 110. The bays 108 may be arranged in one dimension, two dimensions (as shown in FIGS. 1 and 2), or in three-dimensional arrays. Multiple drive trays 104 may be stacked together to form larger systems 100 as required. In one embodiment of the invention, the bays 108 are oriented to allow the drive modules 106 to be inserted and removed along a horizontal path, as shown by line 112. This orientation is both convenient for a user of the system 100 and it helps keep the bays 108 free from dust and debris that may fall from above. Other orientations and insertion/removal paths may be used to meet space claim requirements for the drive tray 104 and user access requirements for the drive modules 106.

Figure 3:
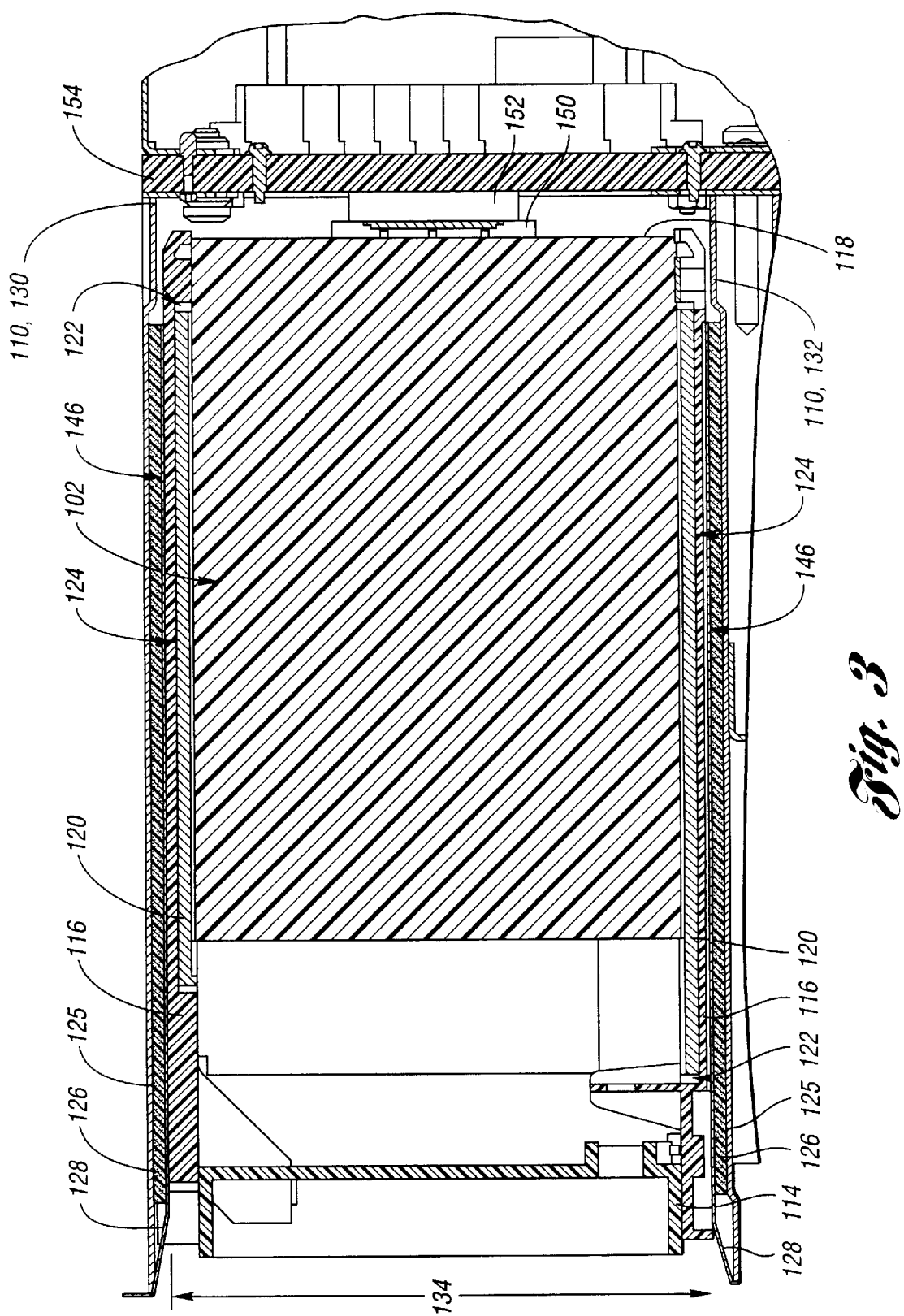
FIG. 3 is a cross-sectional view taken along line 3—3 of FIG. 2 showing a drive module residing in a bay of the system, and a media drive mounted in the drive module.

FIG. 3 is a cross-sectional view along a vertical center line through one of the drive modules 106 inserted into the drive tray 104. The drive module 106 includes, but is not limited to, a handle 114 and two shells 116 that surround one of the media drives 102. In one embodiment, the media drive 102 is a hard magnetic disk drive, although other types of drives may be enclosed by the drive module 106, such as optical drives, magneto-optical drives and tape drives.

The two shells 116 may be made of an electrically insulating material. This allows a media drive chassis 118 of the drive module 106 to be electrically isolated from the drive tray housing 110 and other media drives 102 if so required by the grounding scheme for the system 100. An example of a suitable material for the two shells 116 is LEXAN® 500, available from the General Electric Company, Pittsfield, Mass. LEXAN® 500 is a polycarbonate having good electrical insulating, mechanical and chemical characteristics over a wide range of environmental conditions. In alternative embodiments, the two shells 116 may be made of other materials, including electrically conductive materials, that meet or exceed operating and storage requirements for the drive module 106. For example, the two shells 116 may be made of a conductive material, such as aluminum, when the media drive chassis 118 is constructed from or coated with a nonconductive material. In another example, it may be desirable to fabricate the two shells 116 from a conductive material. This will help establish a grounding path between the media drive chassis 118 and the drive tray housing 110 through the drive module 106 and other conductive layers.

One or more plates 120 may be included in the drive module 106. Plates 120 are typically, although not necessarily, made from steel and are firmly attached to the media drive chassis 118, such as with bolts, to establish good mechanical coupling. Each plate 120 also fits snugly into a cavity 122 formed in the two shells 116. In the embodiment shown in FIG. 3, the plates 120 engage the shells 116 from inside the cavity 122. No adhesive material is used at interfaces 124 between the plates 120 and the shells 116. This approach allows the plates 120 and shells 116 to rub ever so slightly against each other thereby generating heat from the resulting friction or shearing. Consequently, a portion of the vibrational energy traversing across the interfaces 124 from the shells 116 to the plates 120, or from the plates 120 to the shells 116, is converted into heat energy and ultimately dissipated.

Each plate 120 is designed to have a resonant frequency chosen to be outside an adverse frequency range for the media drive 102. The adverse frequency range is a band of frequencies to which the media drive 102 is sensitive to vibrations. This sensitivity is commonly associated with the head servos in disk-type media drives. Sufficiently large shock impulses and vibrations around natural resonant frequencies in the head servos can knock the head servos off track thus causing read and write errors. It does not matter if these shocks and vibrations are generated externally and feed into the media drive 102, or are generated internal to the media drive 102 by the spinning disks and seeking drive servo. The plates 120 are operative to convert shock and vibration energy that they may encounter into resonant vibrations at the predetermined resonant frequency. Each plate may have the same resonant frequency or a different resonant frequency. Here, any resonant vibration energy transferred from the plates 120 to the media drive chassis 118 will be at a frequency that has minimal impact on the media drive operations. An example plate 120 may be a steel plate 0.150 inches thick and having its first resonant frequency at 1600 Hz. This resonant frequency is well above a 30–800 Hz adverse frequency range for a typical disk drive.

Figure 4:
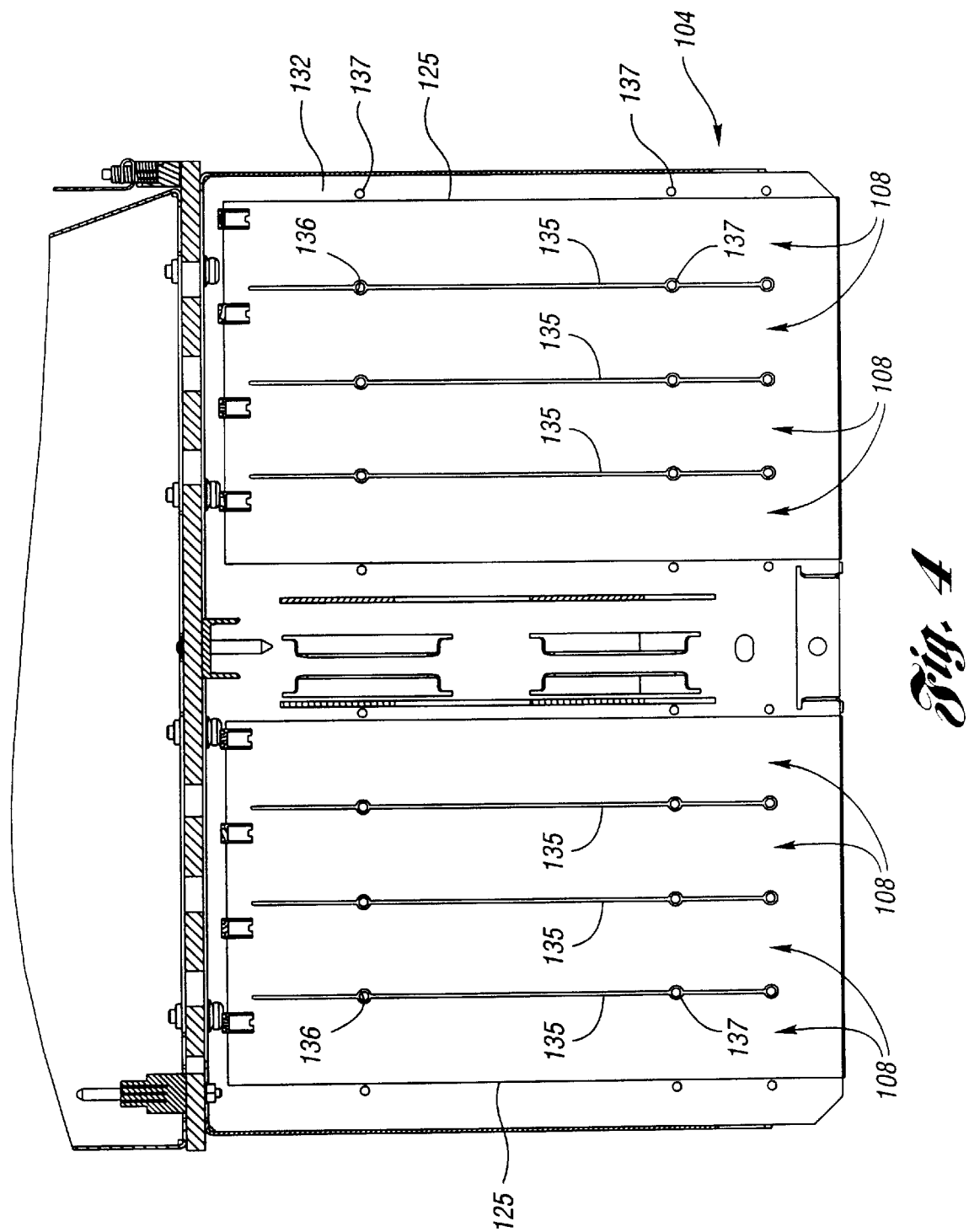
FIG. 4 is a cross-sectional view taken along line 4—4 of FIG. 2 with the drive modules removed to show a slotted foam laminate of the system.

Referring to FIGS. 3 through 4, energy absorbing members such as foam laminates 125 are disposed between the drive modules 106 and the drive tray housing 110 for dampening shocks and vibrations. Each foam laminate 125 may include, but is not limited to, a resilient layer 126 adjoining a cover layer 128. In the embodiment shown in FIGS. 3 and 4, a first or top foam laminate 125 is positioned between top surfaces of two or more drive modules 106 and a top shelf 130 of the drive tray housing 110. A second or bottom foam laminate 125 is positioned between bottom surfaces of two or more drive modules 106 and a bottom shelf 132 of the drive tray housing 110 (although only the bottom foam laminate 125 is shown in FIG. 4, the top foam laminate 125 may be provided with a similar configuration). As shown in FIG. 4, for example, each bottom foam laminate 125 may be configured to extend into four bays 108 so as to be positioned between four drive modules 106 and the bottom shelf 132 when the drive modules 106 are disposed in the bays 108. Similarly, each top foam laminate 125 may be configured to extend into four bays 108, for example, so as to be positioned between four drive modules 106 and the top shelf 130 when the drive modules 106 are disposed in the bays 108.

Each resilient layer 126 of the foam laminates 125 may be attached to a respective top or bottom shelf 130 or 132 with an adhesive. Cover layers 128 are positioned between the resilient layers 126 and the drive modules 106. Alternatively, the cover layers 128 may be eliminated if not required for a particular application. A height of each bay opening, as indicated by dimension 134 in FIG. 3, is designed to be slightly less than the height of the drive modules 106. Consequently, the resilient layers 126 are compressed when the drive modules 106 are installed in the bays 108.

Referring to FIG. 4, each of the top and bottom foam laminates 125 has one or more isolation slots 135 for inhibiting transmission of shocks and vibrations between adjacent drive modules 106 (although only the bottom foam laminate is shown in FIG. 4, the top foam laminate may be provided with a similar configuration). A foam laminate 125 having one or more such slots 135 may be referred to as a slotted foam laminate 125. In the embodiment shown in FIG. 4, each slot 135 is disposed at least partially between adjacent bays 108. Each slot 135 may be a continuous slot, or include two or more spaced slot segments. In the embodiment shown in FIG. 4, for example, each slot 135 is continuous and includes three enlarged apertures 136, which receive guide pins 137 of the drive tray 104. The guide pins 137 separate or otherwise define the bays 108, and function to guide the drive modules 106 into the bays 108, as well as to lock the drive modules 106 in the bays 108.

As shown in FIG. 4, each slot 135 has a length less than a length of the respective foam laminate 125. Furthermore, each slot 135 may have any suitable width sufficient to impede energy transmission between the drive modules 106. For example, each slot 135 may have a width in the range of 0.001 to 0.1 inches (excluding the apertures 136). Alternatively, each slot 135 may have a greater or narrower width. In addition, the slots 135 may be formed in any suitable manner, such as by cutting the foam laminates 125 with dies having shearing projections.

By using foam laminates 125 above and below the drive modules 106, and by providing each foam laminate 125 with one or more slots 135 disposed between adjacent drive modules 106, individual media drives 102 are isolated from their neighbor's vibration energy. This creates an optimum situation by, in effect, allowing each media drive 102 to have its own system unperturbed by the neighboring media drives 102 (see FIGS. 5 and 6 for vibration energy comparisons of systems including slotted foam laminates, and systems including un-slotted foam laminates). Top and bottom foam laminates 125 provide improved shock protection when compared with a single foam laminate 125 because of the increased effective thickness, and a lack of a hard surface to impact. Two foam laminates 125 also provide effective shock and vibration damping. A large surface area of each drive module 106 engages the top and bottom foam laminates 125 creating short paths between sources of vibrations internal to the media drives 102 and the resilient layers 126 of the foam laminates 125. Alternatively, the system may only include foam laminates 125 disposed above or below the drive modules 106.

Resilient layers 126 provide several beneficial properties to the system operation, including shock and vibration dampening for the drive modules 106. In very simple terms, resilient layers 126 can be thought of as spring/dampers with the drive modules 106 behaving as vibrating masses. Material type, density, stiffness, thickness, and compression of the resilient layers 126 can be optimized to minimize the motion of the drive modules 106 in a frequency range of interest, and in particular, in the adverse frequency range.

A resilient layer 126 positioned along the bottom shelf 132 provides vertical support and vertical positioning for multiple drive modules 106. Vertical support is important for avoiding hard contact between the drive modules 106 and the drive tray housing 110 where shocks and vibrations could be transferred undamped. Generally, no resilient layer is positioned along the back side of each bay 108 to accommodate electrical connectors and air flow for fans that may be located along the backs of the media drives 102. One or more additional resilient layers could be located along the backs of the bays 108 in alternative embodiments.

Another benefit of resilient layers 126 is that they engage (through the cover layers 128) a large surface area of each media drive chassis 118. Ideally, resilient layers 126 cover 100% of each drive module's top and bottom surface areas (and side surface areas in alternative embodiments). In practical applications, resilient layers 126 may cover less than 100% of any given surface area of each drive module 106 for cost or space claim reasons. For example, the resilient layer 126 positioned above multiple drive modules 106 may cover only 50% of each drive module's top surface area to avoid appendages (not shown) that create a non-planar surface. If necessary, multiple resilient layers 126 may be used along top and/or bottom surfaces of the drive modules 106 to avoid interferences on the drive modules 106. Coverage as low as approximately 2% on any given surface may be employed within the scope of the present invention.

Suitable materials for the resilient layers 126 include PORON® 479-092 foam and CONFOR® CF-40 foam, which are respectively available from Rogers Corporation of Elk Grove Village, Ill., and EAR Specialty Composites, Aero Company, of Indianapolis, Ind. Such foams remain resilient over a wide range of environmental extremes, have good physical, electrical and environmental properties for common disk drive applications, and have low creep characteristics that provide for a long life span. These foams also have a slow rebound or slow response characteristic that improves energy-attenuating characteristics of the resilient layers 126 as compared with regular foams.

Figure 5:
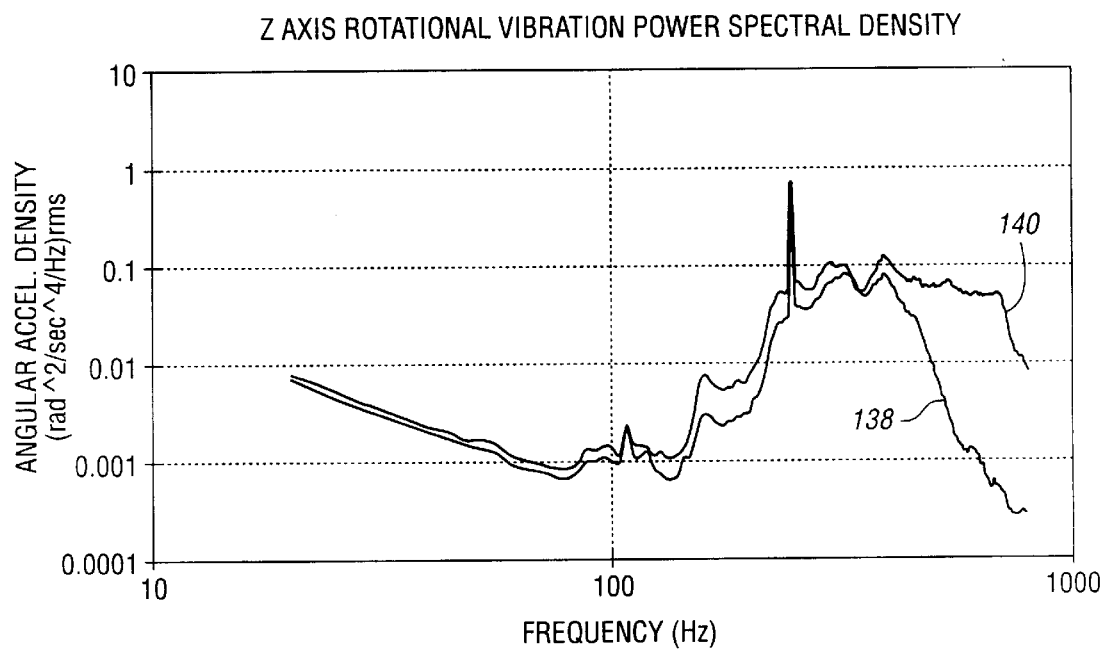
FIG. 5 is a graph comparing angular acceleration density of a system including slotted foam laminates according to the invention and a system including un-slotted foam laminates.

FIG. 5 is a graph comparing angular acceleration density of a system having slotted top and bottom foam laminates that each include PORON® 4790-92 foam (represented by line 138 in FIG. 5), and a system having un-slotted top and bottom foam laminates that each include PORON® 4790-92 foam (represented by line 140 in FIG. 5). Each line 138 and 140 represents average angular acceleration measurements associated with eight drive modules of the respective system. As can be seen in FIG. 5, the system having slotted foam laminates that each include PORON® 4790-92 foam provides significant energy reduction at frequencies above approximately 400 Hertz.

Figure 6:
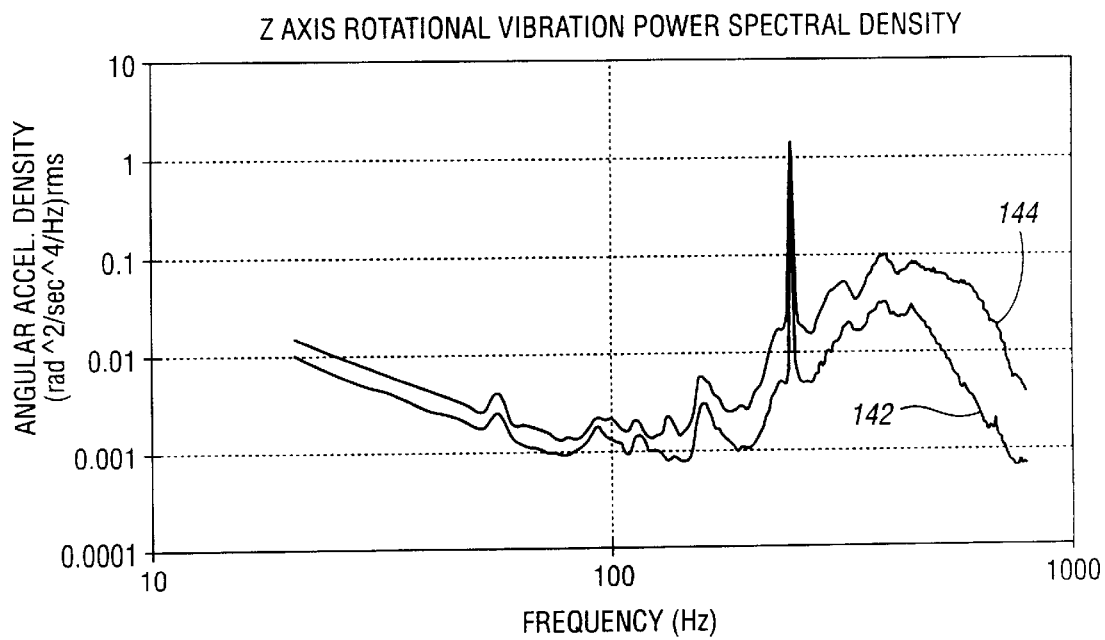
FIG. 6 is a graph comparing angular acceleration density of a system including other slotted foam laminates according to the invention and a system including un-slotted foam laminates.

FIG. 6 is a graph comparing angular acceleration density of a system having slotted top and bottom foam laminates that each include CONFOR® CF-40 Yellow Foam (represented by line 142 in FIG. 6), and a system having unslotted top and bottom foam laminates that each include CONFOR® CF-40 Yellow Foam (represented by line 144 in FIG. 6). Each line 142 and 144 represents average angular acceleration measurements associated with eight drive modules of the respective system. As can be seen in FIG. 6, the system represented by line 142 provides significant energy reduction across the entire frequency spectrum, as compared with the system represented by line 144.

Alternatively, the resilient layers 126 may be made of any suitable material or materials, such as foams, silicone foams, and/or viscoelastic dampening materials. Viscoelastic materials attached to the drive tray housing 110 form free-layer dampers that convert shock energy and vibration energy into heat. Using a rigid material for the cover layers 128, and attaching the cover layers 128 to the resilient layers 126 with adhesive layers 146 (see FIG. 3) create constrained layer dampers. Constrained layer dampers have greater shock and vibration absorbing capacity than free-layer dampers.

Note that each of the resilient layers 126 may be made from the same material or from different materials. For example, one or more resilient layers 126 may be made from slow response foam while at the same time one or more other resilient layers 126 may be made of another material having a viscoelastic characteristic. Furthermore, each resilient layer 126 may have any suitable thickness, such as approximately ⅛ inch or greater, so as to provide suitable shock and vibration damping in practical applications. Narrower thicknesses may also be provided to meet tight space constraints, or for other reasons.

Another function of the cover layers 128 is to provide a tough, friction reducing barrier between the resilient layers 126 and the drive modules 106. LEXAN® FR700 polycarbonate, in sheet form, is one example of a suitable material for forming the cover layers 128. LEXAN® FR700 is available from the General Electric Company, Pittsfield, Mass. Another suitable material for forming the cover layers 128 is FORMEX® GK polypropylene, which is available from ITW Fastex Company of DesPlaines, Ill. Polycarbonate and/or polypropylene type cover layers 128 will slide against polycarbonate type shells 116 of the drive module 106 with acceptable levels of friction when the drive module 106 is inserted into or removed from the bay 108. Cover layers 128 also provide protection for the resilient layers 126 by preventing gouging and tearing by the drive modules 106 or any other object inserted into the bay 108.

Figure 7:
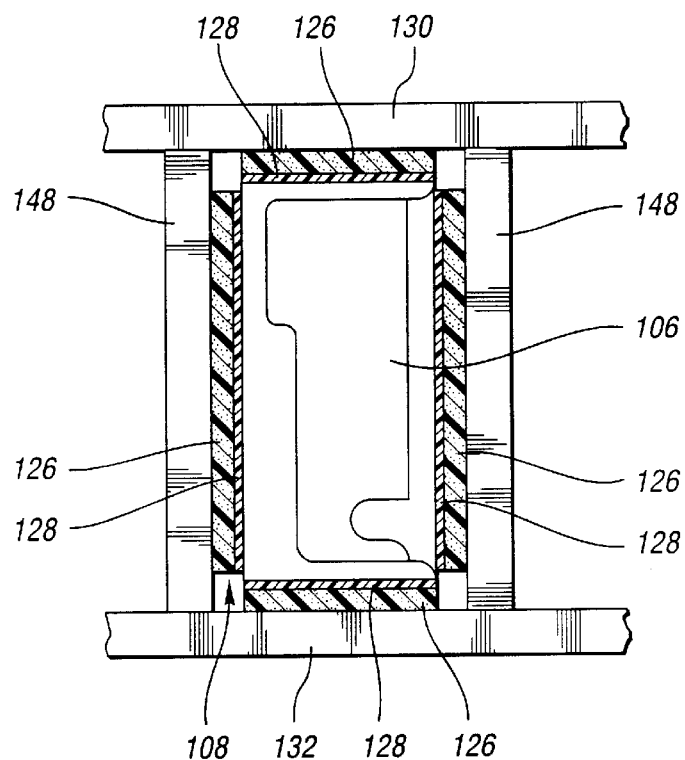
FIG. 7 is a fragmentary front view of a second embodiment of the system according to the invention.

In a second embodiment shown in FIG. 7, each bay 108 may also be provided with opposing sidewalls 148, and the system 100 may further include additional foam laminates having resilient layers 126 and cover layers 128 positioned vertically along the sidewalls 148. Here, these resilient layers 126 provide horizontal positioning of the drive module 106 as well as additional shock and vibration damping. Horizontal and vertical positioning is beneficial when attempting to mate a connector 150 (see FIG. 3) of the media drive 102 with a socket 152 attached to a motherboard 154. If the sidewalls 148 do not extend the full height of the bays 108, then the top or bottom foam laminate may extend between the bays 108 as described above in detail. Other configurations (e.g. horizontally sloped) and shapes (e.g. curved) of the resilient layers 126 may be employed to accommodate other mounting configurations and drive module shapes.

Figure 8:
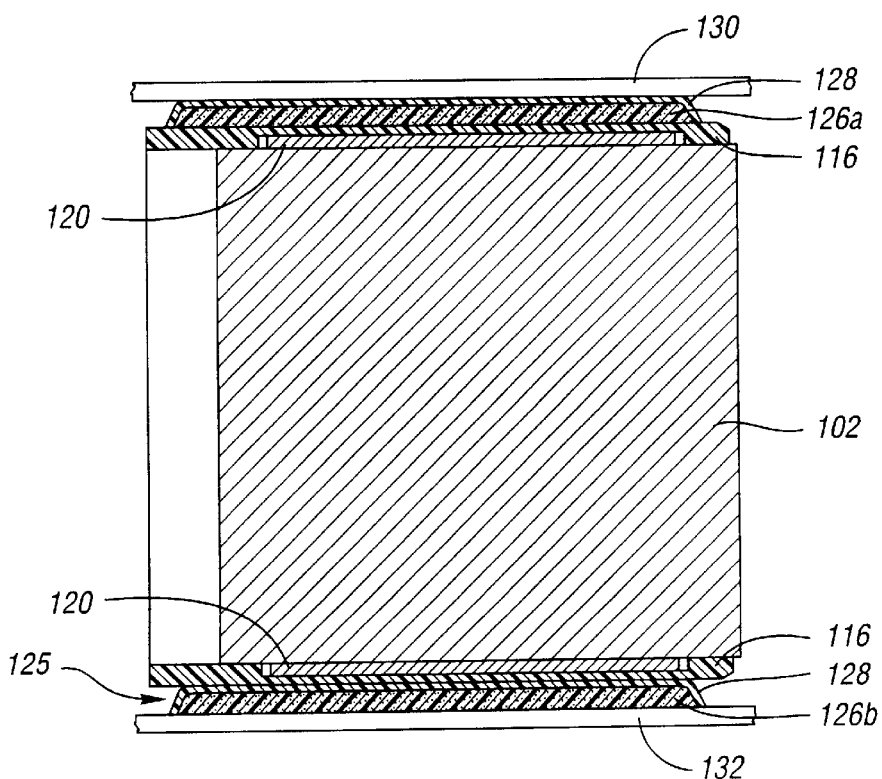
FIG. 8 is a fragmentary cross-sectional view of a third embodiment of the system according to the invention.

FIG. 8 shows a third embodiment of the present invention. In this embodiment, attachment of energy absorbing members such as foam laminates is divided between the drive modules 106 and the drive tray 104. Here, each drive module 106 includes a top foam laminate having a top resilient layer 126a attached directly to a shell 116 of the drive module 106. Furthermore, a bottom foam laminate 125 having a bottom resilient layer 126b is attached to the bottom shelf 132, such that the bottom foam laminate 125 is part of the drive tray 104. With such a configuration, the bottom foam laminate 125 may extend into multiple bays 108 and include one or more slots 135, as described above in detail. Alternatively, the top foam laminate may be attached to the top shelf 130, and each drive module 106 may include a bottom foam laminate having a bottom resilient layer attached directly to a shell 116 of the drive module 106. With this alternative configuration, the top foam laminate may extend into multiple bays 108 and include one or more slots 135, as described above in detail. Furthermore, side resilient layers (not shown) may be fabricated as part of the drive module 106 or part of the drive tray 104.

Figure 9:
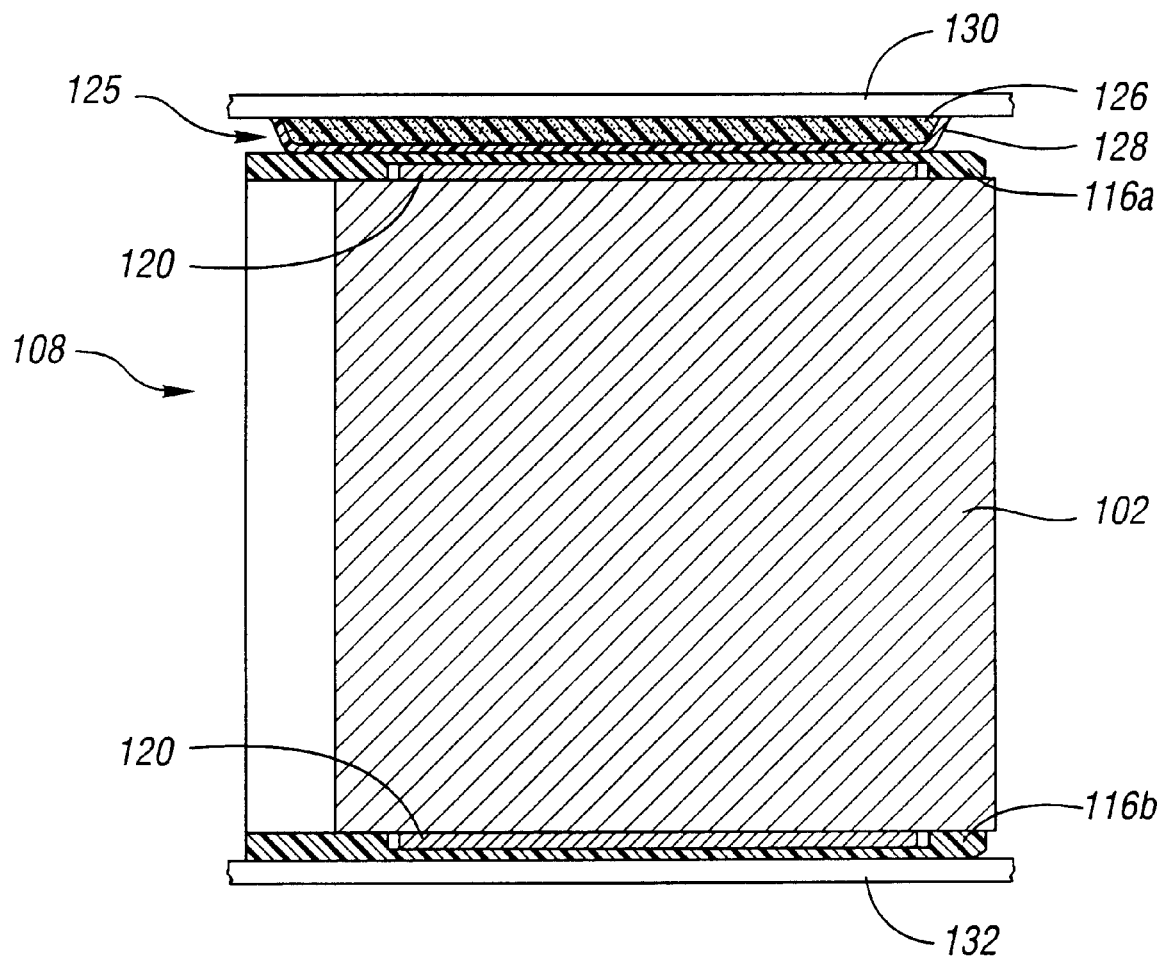
FIG. 9 is a fragmentary cross-sectional view of a fourth embodiment of the system according to the invention.

FIG. 9 shows a fourth embodiment of the invention where only one energy absorbing member such as a foam laminate 125 is employed with multiple drive modules 106. In this embodiment, bottom shell 116b of each of the multiple drive modules 106 rests against the bottom shelf 132. The top shell 116a of each drive module 106 engages the foam laminate 125, which includes cover layer 128 and resilient layer 126 attached to the top shelf 130. Again, foam laminate 125 may extend into multiple bays 108 and include one or more slots 135, as described above in detail. In this embodiment, cover layer 128 may be of a flexible material to allow the drive modules 106 smooth transitions into and out of the bays 108. Alternatively, the foam laminate 125 may be positioned below the drive modules 106. When the foam laminate 125 is positioned below the drive modules 106, then an air gap (not shown) or a retaining spring (not shown) may be used between the top shells 116a and the top shelf 130 to avoid a hard contact between the drive modules 106 and the top shelf 130.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for mounting multiple media drives, the system comprising:
   a housing;
   multiple modules that are insertable into and removable from the housing, each module being adapted to hold a media drive;
   a resilient layer disposed between the housing and the modules when the modules are inserted into the housing for attenuating shocks and vibrations, the resilient layer including a slot for inhibiting transmission of shocks and vibrations between at least two of the modules, wherein the resilient layer has first and second ends, and the slot extends between the ends but not to either end; and
   a cover layer adjoining the resilient layer to facilitate sliding of the modules with respect to the housing during insertion of the modules into the housing and removal of the modules from the housing.

2. The system of claim 1 further comprising an adhesion layer connecting the cover layer to the resilient layer so that the cover layer constrains the resilient layer.

3. The system of claim 1 wherein the cover layer has a slot that is aligned with the slot of the resilient layer.

4. The system of claim 1 wherein the resilient layer is positioned below the modules when the modules are inserted in the housing to provide vertical support to the modules.

5. The system of claim 1 wherein the resilient layer is attached to the housing and has a viscoelastic property for converting shocks and vibrations into heat.

6. The system of claim 1 wherein the slot has a width greater than 0.001 inches.

7. The system of claim 1 wherein the slot has a width in the range of 0.001 to 0.1 inches.

8. The system of claim 1 wherein the resilient layer has a first length and the slot has a second length less than the first length.

9. The system of claim 1 further comprising an additional resilient layer disposed between the housing and the modules when the modules are inserted in the housing such that the modules are positioned between the resilient layer and the additional resilient layer, the additional resilient layer including at least one slot for inhibiting transmission of shocks and vibrations between at least two of the modules.

10. The system of claim 1 wherein each module includes a first plate positioned to engage a media drive, each first plate having a first resonant frequency that is outside an adverse frequency range for the media drives.

11. The system of claim 10 wherein each module further includes a second plate, the first and second plates of each module being positioned to engage opposite sides of a media drive, each second plate having a second resonant frequency that is outside the adverse frequency range for the media drives.

12. The system of claim 1 wherein the resilient layer comprises foam.

13. The system of claim 1 wherein the resilient layer comprises silicone foam.

14. The system of claim 1 wherein the modules are slidably engageable with the cover layer.

15. The system of claim 1 wherein the cover layer is slidably engageable with the housing.

16. The system of claim 1 wherein the cover layer comprises plastic.

17. The system of claim 16 wherein the cover layer comprises polycarbonate.

18. The system of claim 16 wherein the cover layer comprises polypropylene.

19. The system of claim 1 wherein the resilient layer is compressed when the modules are inserted into the housing.

20. A system for mounting multiple media drives, the system comprising:

a housing;

multiple modules that are insertable into and removable from the housing, each module being adapted to hold a media drive;

first and second laminates attached to the housing for receiving the modules therebetween, each laminate including a resilient layer for attenuating shocks and vibrations, each laminate also including a cover layer adjoining a respective resilient layer to facilitate sliding of the modules with respect to the housing during insertion of the modules into the housing and removal of the modules from the housing, each laminate further including multiple slots for inhibiting transmission of vibrations between the modules, wherein each resilient layer has first and second ends, and the slots of each laminate extend between the ends of a respective resilient layer but not to either end.

21. A tray for housing multiple modules, the tray comprising:

a housing having multiple bays adapted to receive the modules;

a resilient layer attached to the housing and extending into each of the bays to attenuate shocks and vibrations, the resilient layer comprising foam and including at least one slot for inhibiting transmission of shocks and vibrations through the resilient layer, wherein the resilient layer has first and second ends, and the slot extends between the ends but not to either end.

22. The tray of claim 21 further comprising a cover layer adjoining the resilient layer to facilitate sliding of the modules with respect to the housing during insertion of the modules into the housing and removal of the modules from the housing.

23. The tray of claim 22 further comprising an adhesion layer connecting the cover layer to the resilient layer so that the cover layer constrains the resilient layer.

24. The tray of claim 22 wherein the cover layer has at least one slot, wherein each slot of the cover layer is aligned with a respective slot of the resilient layer.

25. The tray of claim 22 wherein the modules are slidably engageable with the cover layer.

26. The tray of claim 22 wherein the cover layer comprises plastic.

27. The tray of claim 22 wherein the cover layer comprises polycarbonate.

28. The tray of claim 22 wherein the cover layer comprises polypropylene.

29. The tray of claim 21 wherein the resilient layer is positioned on a bottom surface of each bay so as to provide vertical support to the modules.

30. The tray of claim 21 wherein the resilient layer has a viscoelastic property for converting shocks and vibrations into heat.

31. The tray of claim 21 wherein each slot has a width greater than 0.001 inches.

32. The tray of claim 21 wherein each slot has a width in the range of 0.001 to 0.1 inches.

33. The tray of claim 21 wherein the resilient layer has a first length and each slot has a second length less than the first length.

34. The tray of claim 21 further comprising an additional resilient layer attached to the housing and extending into each of the bays to further attenuate shocks and vibrations, the additional resilient layer including at least one slot for inhibiting transmission of shocks and vibrations through the additional resilient layer.

35. A method for attenuating vibrations between multiple media drives and a tray, the method comprising:

converting the vibrations into resonant vibrations at a resonant frequency in multiple plates associated with the media drives, the resonant frequency being outside an adverse frequency range for the media drives, wherein the multiple plates include first and second plates disposed on opposite sides of one of the media drives; and damping the resonant vibrations in multiple resilient layers disposed between the tray and the media drives, two of the resilient layers being positioned such that the media drives are disposed between the two resilient layers, each of the two resilient layers having at least one slot for inhibiting transmission of resonant vibrations between at least two of the media drives.

36. The method of claim 35 further comprising converting the resonant vibrations into heat at interfaces between the plates and a shell adjoining the plates.

37. The method of claim 35 wherein damping the resonant vibrations includes converting the resonant vibrations into heat through a viscoelastic property of the resilient layer.

38. The method of claim 37 further comprising constraining the resilient layer to support conversion of the resonant vibrations into heat.

39. The method of claim 35 wherein each resilient layer comprises foam.

40. A system for mounting multiple media drives, the system comprising:

a housing;

multiple modules that are insertable into and removable from the housing, each module being adapted to hold a media drive and including first and second plates positioned to engage opposite sides of the media drive, each first plate having a first resonant frequency that is outside an adverse frequency range for the media drives, and each second plate having a second resonant frequency that is outside the adverse frequency range for the media drives; and a resilient layer disposed between the housing and the modules when the modules are inserted into the housing for attenuating shocks and vibrations, the resilient layer including a slot for inhibiting transmission of shocks and vibrations between at least two of the modules.

* * * * *